INVENTOR.
Harold R. Horning.
BY
Cubett, Mahoney & Miller
ATTORNEYS

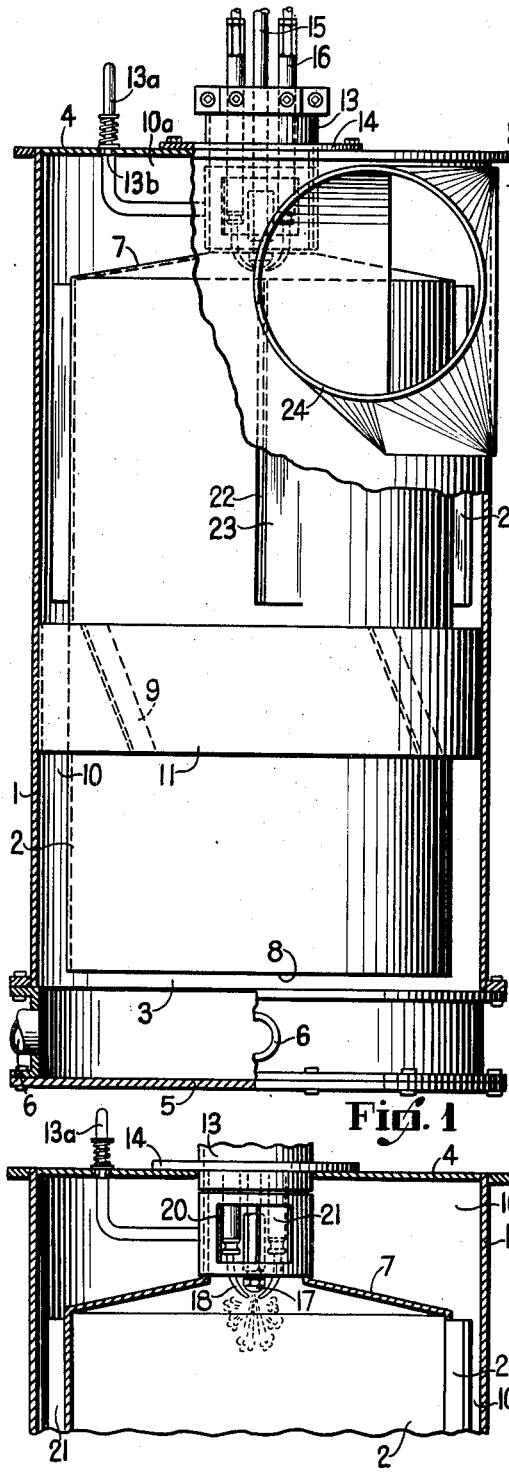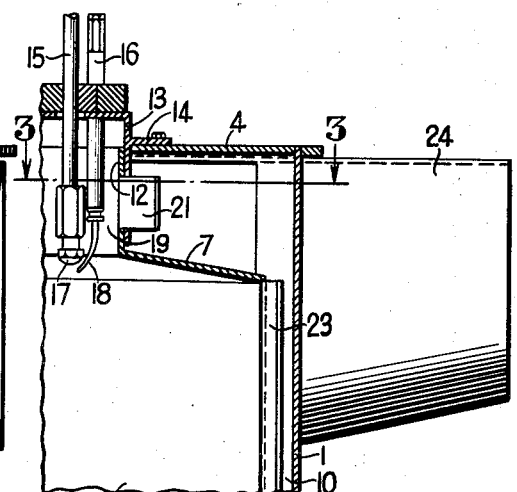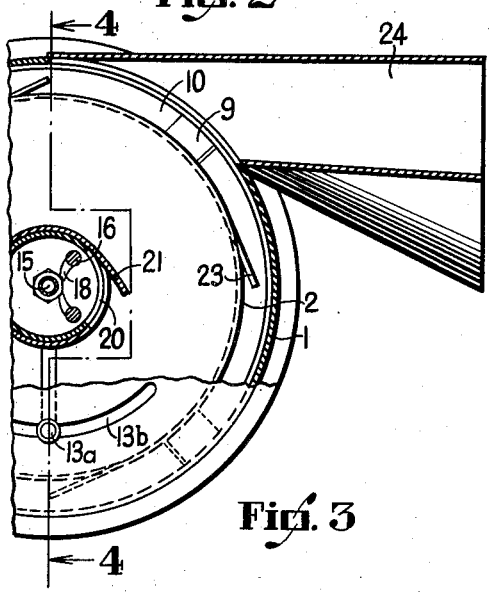

Patented May 15, 1951

2,553,091

UNITED STATES PATENT OFFICE 2,553,091

HEATER

Harold R. Horning, Columbus, Ohio

Application September 11, 1948, Serial No. 48,840

4 Claims. (Cl. 263—19)

My invention relates to a heater. It has to do, more particularly, with a small and compact heater which uses oil as the fuel. Due to its compactness and efficiency, the heater is particularly suitable for use on portable machines having space and weight limitations. For example, my heater may be used on a road-paving machine for heating the screed or screeds thereof so that it can effectively act on bituminous mixes or other mixes which require the use of a heated screed.

One of the objects of my invention is to provide an extremely simple and compact heater but which has a high degree of efficiency.

Another object of my invention is to provide a heater which employs oil or other liquid fuel and which is provided with novel means for insuring a thorough mixing of the liquid fuel and air for combustion.

Still another object of my invention is to provide a heater of the type indicated having a novel arrangement for circulating the air to be heated so that it will effectively absorb heat from the combustion chamber as it is circulated in association therewith.

A further object of my invention is to provide a heater of the type indicated having a novel arrangement for circulating air between an inner combustion chamber and an outer casing so that the outer casing will be effectively insulated from the heat of the combusion chamber.

The preferred embodiment of my invention is illustrated in the accompanying drawings wherein similar characters of reference designate corresponding parts and wherein:

Figure 1 is a view partly in vertical section and partly in side elevation illustrating my heater.

Figure 2 is an enlarged vertical sectional view through the upper portion of the heater at one side thereof.

Figure 3 is a horizontal sectional view taken substantially along line 3—3 of Figure 2.

Figure 4 is a vertical sectional view taken substantially along line 4—4 of Figure 3.

Figure 5:
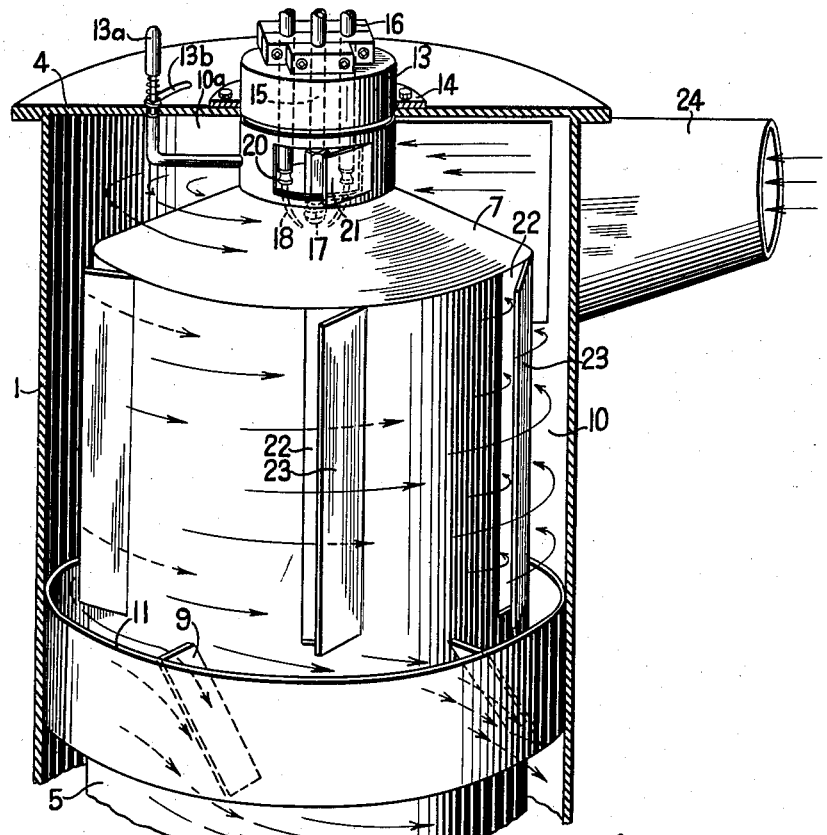
Figure 5 is a view showing the outer casing of the heater mainly in vertical section and the inner combustion chamber in perspective.
Figure 6:
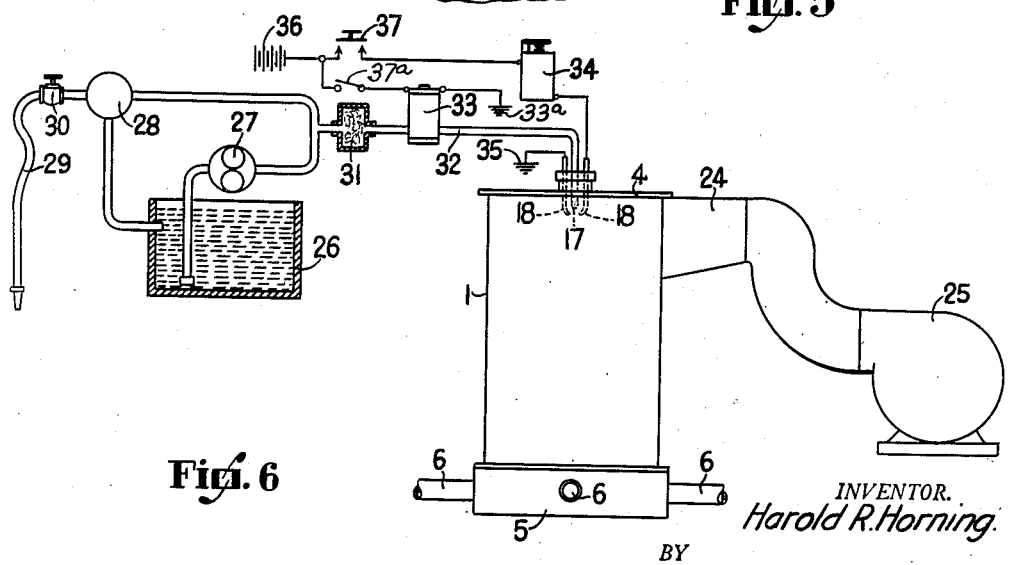
Figure 6 is a diagrammatic view of my heater and the control system therefor.

With reference to the drawings, I have illustrated my heater as consisting mainly of an outer casing or shell 1 and an inner casing or combustion chamber 2. The casing 1 is formed of suitable metal, such as sheet metal, and is of cylindrical form being provided with an open lower end 3 and an upper end closed by a cap 4. The lower open end 3 of the casing is supported by and communicates with the upper side of a heat-distributing chamber 5 which is provided with a suitable number of ducts 6 for conducting the heated air to one or more units to be heated by my heater.

The combustion chamber 2 is formed of similar metal and is mainly of cylindrical form but has a dome-shaped upper end 7 and an open lower end 8 which is spaced slightly above the lower end of the casing 1. It will be noted that the upper end 7 is spaced below the cap 4 of the outer casing. The combustion chamber 2 is supported in concentrically spaced relationship within the outer casing or shell 1. For so supporting the chamber 2 from the outer casing 1, a plurality of metal baffle plates 9 are provided in the space 10 between the casing 1 and chamber 2. It will be noted that these baffle plates 9 are disposed a substantial distance above the lower end of the heater and are secured, for example, by welding, to the outer surface of the chamber 2 and to the inner surface of a wide ring 11 of metal which is suitably attached to the outer casing 1. The baffle plates 9 are located at circumferentially spaced intervals and are disposed at an angle relative to the vertical. It will be noted that the annular space 10 extends from the lower end of the chamber 2 to the upper end thereof where it joins with the space 10a above the wall 7.

The dome-shaped top wall 7 of the chamber 2 is provided with a centrally located upstanding collar 12. A similar collar 13 is slipped over the upper end of this collar 12 and is carried rotatably thereon. A cap member 14 is bolted to the cap 4 and it will be noted that the cap 4 is provided with a central opening through which the flange 13 on cap 14 depends. The upper portion of the cap 14 supports a fuel-atomizing nozzle 15 and a pair of electrodes 16 which, it will be noted, extend downwardly through the collar 12 below the lower edge thereof. The nozzle 15 may be of any suitable type being provided with a suitable atomizing head 17 with which the opposed ignition points 18 are associated. Thus, atomizing of the fuel and the ignition thereof will take place at the central part of the dome 7.

The collar 12 serves to provide an upper chamber 19 which is adapted to receive primary air for combustion and supply it to the fuel issuing from the atomizing head 17. This primary air for combustion enters through aligning openings 20 formed in one side of the collars 12 and 13. It will be noted that a portion of the section of metal removed from the opening 20 in the collar 13 is bent outwardly to form a baffle plate 21 which will direct air from the chamber 10a into the chamber 19. The collar 13 may be rotated relative to collar 12 to vary the effective size of inlet opening 20 by means of a handle 13a attached thereto and having an upstanding portion extending upwardly through an arcuate slot 13b in cap 4 of casing 1.

At circumferentially spaced intervals adjacent its upper end, the wall of the combustion chamber 2 is provided with vertical slots 22. It will be noted that these slots extend substantially from the ring 11 to the dome-shaped upper end of the chamber 2. These slots 22 are formed by slitting the wall of the chamber 2 and then bending the metal outwardly to provide the outwardly extending baffle plates 23 which extend angularly into the annular space 10.

For supplying air to the heater, an inlet duct 24 is connected to the upper end of the casing 1 in substantially tangential relationship thereto, as shown best in Figure 3. This duct 24 is connected to a blower 25.

For supplying liquid fuel to the heater, a reservoir 26 is provided and has a pump 27 associated therewith. A pressure relief valve 28 is connected to the pump and a flexible hose 29 may also be connected to the pump with the flow of oil thereto being controlled by a manually operable valve 30. The hose 29 may be used for spraying certain parts of the machine, upon which the heater is mounted, with oil. The pump 27 pumps oil through a filter 31 into the line 32 which is connected to the nozzle 15. A solenoid actuated valve 33 is associated with the line 32. A vibrator spark coil 34 is connected to one of the ignition points 18, the other being grounded as at 35. A source of current 36 is provided and a switch 37 may be actuated to connect this source to the vibrator coil 34. The source of current is also connected to the solenoid of the valve 33 by a line including switch 37a, the solenoid being grounded by ground 33a.

In the operation of this heater, the air to be heated is forced under pressure through the inlet duct 24 into the upper large annular chamber 10a. This air will swirl around in this chamber, since it is injected tangentially, and most of it will be directed downwardly by the dome-shaped wall 7. However, the primary air for combustion will be scooped in by the baffle 21 from the chamber 10a and will be directed into the chamber 19 and be forced downwardly in association with the nozzle head 17 where it will mix with the atomized fuel. The air from the chamber 10a will be forced into the annular space 10 and will travel downwardly therethrough in a helical path. Part of this air will be directed by the baffles 23 through the slots 22 into the chamber 2 where it will mix with the burning fuel to provide secondary air for combustion. The air which enters within the chamber 2 and the hot products of combustion therein will travel downwardly and will be discharged from the lower end of the chamber 2 into the distributing chamber 5. The air which travels around the chamber 2 and downwardly will absorb heat from the exterior of the combustion chamber 2. The baffle plates 9 will serve to further break up this swirling mass of air and direct it downwardly along the lower end of the chamber 2 into the distributing chamber 5. Thus, part of the air will be heated by direct association with the burning gases within the chamber 2, this being the air that enters within the chamber through the openings 20 and 22. The other air on the exterior of the chamber 2 will be heated by means of conduction through the wall of the chamber 2. Causing the air to travel through the chamber 10, not only heats such air but insulates the outer casing 1 from the combustion chamber 2. The unit or units to be heated and to which the pipe or pipes 6 are connected will be provided with an exhaust opening.

It will be apparent from the above description that I have provided a very compact heater which is highly efficient. A number of advantages of this heater have been discussed above and others will be apparent.

Having thus described my invention, what I claim is:

1. A heater comprising an outer cylindrical casing having an upper end closed by a cap and a lower open end, an inner cylindrical combustion chamber supported within said casing in concentric relationship thereto so as to form an annular passageway extending downwardly along said chamber, the lower end of said chamber and the lower end of said passageway being open, a distributor to which the lower ends of said chamber and passageway are connected, a dome-shape wall closing the upper end of said combustion chamber and spaced below the cap of said casing, an upstanding annular extension of the combustion chamber at the center of the dome-shape wall and extending between said wall and said cap, said extension being of substantially less diameter than said combustion chamber to form an upper annular chamber which communicates with said passageway at its upper end, said extension comprising cooperating collars which are relatively rotatable to vary the effective size of an inlet opening formed therein, an operating member connected to said collars and extending to a point outside the casing by means of which they may be relatively rotated, a baffle member on said extension at said inlet and extending into said annular chamber so as to direct air from said chamber through said inlet, fuel-supplying and igniting means disposed within said extension, said combustion chamber being provided with vertically disposed slots formed therein at circumferentially spaced intervals with baffle plates associated therewith and extending angularly into said annular passageway so as to direct air from said passageway through said slots into the combustion chamber, and a duct for supplying air under pressure connected tangentially to the upper end of said annular passageway and to said annular chamber so as to direct air onto the upper end of said combustion chamber so that some of the air will be directed upwardly by said dome-shape wall and will be directed by the baffle on the extension through the adjacent inlet to serve as primary air for combustion but most of it will be directed downwardly by said dome-shape wall in a helical path in said annular passageway and will be directed through said vertical slots by the adjacent baffles to serve as secondary air for combustion.

2. A heater comprising an outer cylindrical casing having an upper end closed by a cap and a lower open end, an inner cylindrical combustion chamber supported within said casing in concentric relationship thereto so as to form an annular passageway extending downwardly along said chamber, the lower end of said chamber and the lower end of said passageway being open, a distributor to which the lower end of said chamber and passageway are connected, a dome-shape wall closing the upper end of said combustion chamber and spaced below the cap of the casing, an upstanding annular extension of the combustion chamber at the center of the dome-shape wall and extending between said wall and said cap, said extension being of substantially less diameter than said combustion chamber to form an upper annular chamber which communicates with said passageway at its upper end and having an inlet, a baffle member on said extension at said inlet and extending into said annular chamber so as to direct air from said chamber through said inlet, fuel-supplying and igniting means disposed within said extension, said combustion chamber being provided with vertically disposed slots formed therein at circumferentially spaced intervals with baffle plates associated therewith and extending into said annular passageway so as to direct air from said passageway through said slots into the combustion chamber, and a duct for supplying air under pressure connected tangentially to the upper end of said annular passageway and to said annular chamber so as to direct air onto the upper end of said combustion chamber so that some of the air will be directed upwardly by said dome-shape wall and will be directed by the baffle on the extension through the adjacent inlet to serve as primary air for combustion but most of it will be directed downwardly by said dome-shape wall in a helical path in said annular passageway and will be directed through said vertical slots by the adjacent baffles to serve as secondary air for combustion.

3. A heater comprising an outer cylindrical casing having an upper end closed by a cap and a lower open end, an inner cylindrical combustion chamber supported within said casing in concentric relationship thereto so as to form an annular passageway extending downwardly along said chamber, the lower end of said chamber and the lower end of said passageway being open, a distributor to which the lower end of said chamber and passageway are connected, a dome-shape wall closing the upper end of said combustion chamber and spaced below the cap of said casing, an upstanding annular extension of the combustion chamber at the center of the dome-shape wall and extending between said wall and said cap, said extension being of substantially less diameter than said combustion chamber to form an upper annular chamber which communicates with said passageway at its upper end and having an inlet, fuel-supplying and igniting means disposed within said extension, said combustion chamber being provided with vertically disposed slots formed therein at circumferentially spaced intervals, and a duct for supplying air under pressure connected tangentially to the upper end of said annular passageway and to said annular chamber so as to direct air onto the upper end of said combustion chamber so that some of the air will be directed upwardly by said dome-shape wall through the inlet in the extension to serve as primary air for combustion but most of it will be directed downwardly by said dome-shape wall in a helical path in said annular passageway and through said vertical slots to serve as secondary air for combustion.

4. A heater comprising an outer cylindrical casing having an upper end closed by a cap and a lower open end, an inner cylindrical combustion chamber supported within said casing in spaced relationship thereto so as to form an annular passageway extending downwardly along said chamber, the lower end of said chamber and the lower end of said passageway being open, a distributor to which the lower end of said chamber and passageway are connected, a wall closing the upper end of said combustion chamber and spaced below the cap of said casing, an upstanding annular extension of the combustion chamber at the center of said wall and extending between said wall and said cap, said extension being of substantially less diameter than said combustion chamber to form an upper annular chamber which communicates with said passageway at its upper end and having an inlet, fuel-supplying and igniting means disposed within said extension, said combustion chamber being provided with openings in its wall, and a duct for supplying air under pressure connected tangentially to the upper end of said annular passageway and to said annular chamber so as to direct air onto the upper end of said combustion chamber so that some of the air will be directed between said wall and said cap through the inlet in the extension to serve as primary air for combustion but most of it will be directed downwardly in a helical path in said annular passageway and through said openings to serve as secondary air for combustion.

HAROLD R. HORNING.

REFERENCES CITED

The following references are of record in the file of this patent:

UNITED STATES PATENTS

| Number | Name | Date |
| --- | --- | --- |
| 2,072,731 | Crosby | Mar. 2, 1937 |
| 2,110,209 | Engels | Mar. 8, 1938 |
| 2,225,775 | Garrett | Dec. 24, 1940 |
| 2,418,097 | Ruff | Mar. 25, 1947 |
| 2,475,911 | Nathan | July 12, 1949 |
| 2,488,911 | Hepburn et al. | Nov. 22, 1949 |

FOREIGN PATENTS

| Number | Country | Date |
| --- | --- | --- |
| 588,086 | Great Britain | Apr. 1, 1943 |